RADIO COMMAND BUOY SYSTEM

Filed Dec. 30, 1965

INVENTORS
SAMUEL PURE
JAMES R. HOWARD
BY
ATTORNEY

United States Patent Office 3,564,489

Patented Feb. 16, 1971

3,564,489
RADIO COMMAND BUOY SYSTEM

Samuel Pure, Rydal, and James R. Howard, Huntingdon Valley, Pa., assignors to the United States of America as represented by the Secretary of the Navy Filed Dec. 30, 1965, Ser. No. 517,800
Int. Cl. G01s *9/66;* H04b *1/00*
U.S. Cl. 340—2 3 Claims

ABSTRACT OF THE DISCLOSURE

A radio command buoy system having an RF command link for selectively operating from a remote station a plurality of remote underwater sound source buoys deployed in a water area of interest. A pair of manually operated selector switches pass two different tones from a plurality of discrete tone generators and the selected tones are combined and transmitted on a carrier wave. Each buoy is a radio receiving station having a decoder responsive to a selected pair of different of said tones. The decoder output operates a stepping switch connected between a power supply and a plurality of electrically fired explosive charges. Each time the decoder tones are transmitted, the stepping switch causes a succeeding charge to explode.

Figures 1, 2:
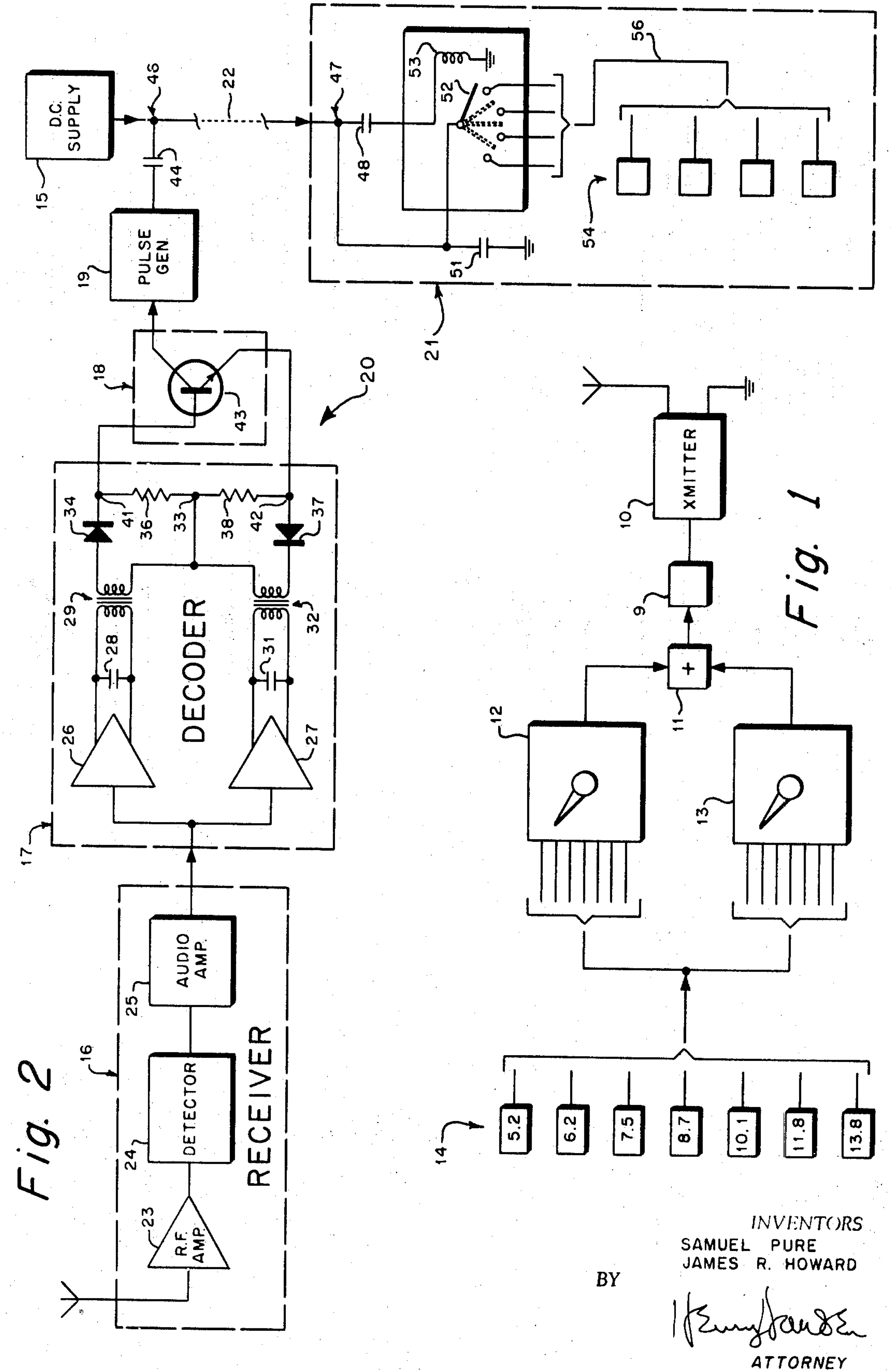

The invention described herein may be manufactured and used by or for the Government of the United States without the payment of any royalties thereon or therefor.

The present invention relates to a radio command buoy system and more particularly to a radio command buoy system having an R.F. command link for selectively operating a plurality of remote underwater sound source buoys from a remote position.

The airborne anti-submarine warfare (ASW) program includes the detection and localization of submarines by sonobuoys which radio transmit underwater acoustical information to patrol aircraft. For detecting silent submarines, an explosive echo-ranging (EER) system is employed whereby sonobuoys are activated by the direct and submarine-reflected sounds generated from separate underwater sound source buoys. For large ocean areas of search, multiple EER systems are deployed, and each buoy is assigned a discrete R.F. command modulating frequency on a given carrier frequency which will enable selective command of mode or operation. For a given carrier frequency or channel, a maximum modulation bandwidth is permitted by regulations, and the number of discrete command modulating frequencies which can be allocated to buoys within the bandwidth will depend upon the degree of frequency resolution which can be maintained. That is, less frequency separation along the bandwidth spectrum between each assigned command frequency necessitates more elaborate and complex filter components, and conversely it results in higher costs and/or increased weight and size. As the area of search increases or the degree of search intensifies, the number of command buoys can be increased only until the permitted modulation frequency bandwidth is saturated. Further increases would necessitate additional R.F. systems operating on different carrier frequencies or channels, or substitution of more sophisticated and expensive filtering networks.

Accordingly, it is an object of the present invention to provide a novel radio command buoy system which permits a large number of buoys to be selectively activated by discrete R.F. signals from a remote position, in which a relatively narrow R.F. bandwidth is utilized, and in which each buoy responds to a distinctly different command signal.

Another object of the invention is to provide an improved R.F. discriminating command underwater sound source buoy system which is characterized to occupy very little of the frequency spectrum of an assigned bandwidth, which is extremely reliable for its intended environment and use, which is relatively inexpensive to manufacture and maintain, and which is especially suitable for use in airborne ASW missions.

Various other objects and advantages will appear from the following description of one embodiment of the invention, and the most novel features will be particularly pointed out hereinafter in connection with the appended claims.

In the drawing:

FIG. 1 represents a block diagram of a radio command transmitting station of the present invention; and FIG. 2 represents a combination block and schematic diagram of an underwater sound source buoy of the present invention.

Briefly, the invention comprises a novel radio command buoy system which is particularly suited for activation from an ASW patrol aircraft of a selected underwater sound source buoy from a plurality dispersed in an ocean area of underwater search interest. The aircraft constitutes a radio command transmitting station having a generator of multiple tones from which two are selected in different combinations for modulating an R.F. carrier signal of a transmitter. The particular combination of tones is selected to correspond to the tone combination of one of the plurality of underwater sound source buoys. Each of the buoys includes a radio receiver for detecting the R.F. command signal from the aircraft; the command signal is rejected unless the buoy is tuned for activation by the particular tone combination selected in the aircraft. If so tuned, the two tones generate signals to an AND gate and cause a pulse to fire the first of a plurality of explosive charges depending from the buoy. A stepping switch permits sequential detonation of the remaining charges as subsequent command signals are received. Thus, the invention enables an ASW patrol aircraft to execute a detection and localization mission over a very wide area of interest or to intensify the search mission by making possible the command of a relatively large number of radio command buoys within the allotted bandwidth at the assigned carrier frequency.

Referring now the illustrated embodiment of the invention, the radio command transmitting station shown in FIG. 1 is intended for use in any moving or fixed platform, but is applied herein to airborne use in an ASW patrol aircraft. The station includes a high-power UHF, amplitude-modulated transmitter 10 which is designed to operate at an assigned carrier frequency and modulation bandwidth with a minimum of distortion. For purposes of explanation, the assigned carrier frequency will be 291.4 mc., and the bandwidth from 200 c.p.s. to 200 kc. The modulation input control signal to the transmitter 10 is connected through timer 9 to the input of a summing network 11 which has two inputs from respective multiple input selector switches 12 and 13. The timer 9 limits the duration of the control signal. The summing network may be of a conventional circuit design whereby two input signals are algebraically added and their sum appears at the output. The selector switches 12 and 13 may also be conventional and may be of the mechanical or electrical type. In the disclosed embodiment these switches are merely armatures electrically connected to the summing network input and manually rotated over contacts to complete a circuit to one of its plural inputs. The inputs of each switch 12, 13 are respectively connected to a plurality of tone generators 14 each of which generates a separate and distinct frequency within the assigned modulation bandwidth; for example, the seven illustrated tone generators 14 produce outputs of 5.2, 6.2, 7.5, 8.7, 10.1, 11.8 and 13.8 kc. It is contemplated that tone generators 14 may be of any well-known type frequency generators such as a crystal oscillator, tuning fork or multivibrator. The number of tones generators 14, and of course inputs to switches 12 and 13, are determined by the maximum number of command buoys to be utilized on an ASW mission, the maximum bandwidth at the assigned carrier frequency, and the frequency separation necessary between the modulating frequencies along the spectrum of the bandwidth. For the seven tone generators 14, there is a possible number of 21 two-tone combination selectable by switches 12 and 13 as inputs to the summing network 11. Due to undesirable side tone signals inherently resulting from certain combinations of frequencies, the number of combinations may be somewhat reduced rather than compensate with more expensive filter circuits.

Referring now to FIG. 2, one of the underwater sound source buoys of the command buoy system generally comprises a flotation section indicated by the numeral 20 and includes a receiver 16, a decoder 17, AND gate 18, a pulse generator 19 and a D.C. supply 15. An explosive charge section 21 depends by a cable 22 from the flotation section 20.

The receiver 16 converts the R.F. signal from the antenna to an audio signal through a serially connected R.F. amplifier 23, detector 24 and audio amplifier 25, respectively, and the audio output signal is fed to the inputs of two amplifiers 26 and 27 of the decoder 17. A two-wire output from the amplifier 26 connects across an L-C circuit which includes a capacitor 28 and the primary winding of a transformer 29. The L-C network is tuned to resonate at one of the seven modulating frequencies produced by the tone generators 14, for example, 5.2 kc. Similarly, an L-C circuit including a capacitor 31 and the primary winding of a transformer 32 are connected across a two-wire output from the amplifier 27, and the L-C circuit is tuned to resonate at another of the modulating frequencies produced by the tone generators 14, for example 7.5 kc.

One terminal of each secondary winding of transformers 29 and 32 is connected in common at a junction 33. The other terminal of the secondary winding of transformer 29 is connected through a diode 34 and resistor 36 to junction 33; and the other terminal of the secondary winding of transformer 32 is connected through a diode 37 and resistor 38 to the junction 33. D.C. pulses are thereby produced at junctions 41 and 42, located at the common connections of diode 34 and resistor 36, and diode 37 and resistor 38, respectively, when the L-C circuits resonate.

The AND gate 18 has two inputs which are respectively connected to the junctions 41 and 42 of decoder 17 so that when signals appear at both junctions, an output signal appears at the pulse generator 19. In the inventive embodiment, the AND gate 18 comprises an NPN-type transistor 43 whose base is connected to the junction 41 and emitter to junction 42. The collector is connected to the control input of the pulse generator 19. The polarities of the diodes 34 and 36 are arranged so as to bias the base of the transistor 43 positive with respect to the emitter.

The pulse generator 19, upon receipt of a signal from the AND gate 18, produces a sharp pulse at its output which passes through a capacitor 44 to the cable 22. The D.C. supply 15 is connected to the cable 22 at junction 46 in the flotation section 20 for providing D.C. energy to the explosive charge section 21. Capacitor 44 prevents the D.C. from feeding into the pulse generator 19.

The explosive charge section 21 of the underwater sound source buoy receives the output pulse from the generator 19 and the D.C. power from the supply 15 at a junction 47 in the cable 22. The pulse passes through a capacitor 48 to a control signal input of a sequential stepping switch 50. The switch 50 comprises a plurality of outputs which are sequentially connected through a controlled signal input by normally open connections. As a pulse is received at the control signal input, a connection is momentarily made between the controlled signal input at the first output. A second control signal pulse will produce a momentary connection with the second output, and so on. In the illustrated embodiment, the switch is diagrammatically shown as a mechanical stepping switch having an armature 52, in solid outline, connected to the controlled signal input and in the normally open, starting position. The controlling signal input is connected to a solenoid 53 for stepping the armature 52 through intermediate positions as shown in dotted outline.

The controlled signal input to the switch 50 is connected to the junction 47 and through a capacitor 51 to ground. The capacitor 48 prevents D.C. signals from feeding into the control signal input, and capacitor 51 stores the D.C. energy for discharge through the controlled input of the switch 50. The plural outputs of the switch 50 are respectively connected to a plurality of explosive charges 54 which positioned at fixed intervals along the length of a cable 56. Four charges 54 are illustrated, however the number of charges may be varied as dictated by the requirements of a particular mission. Of course, the spacing between each charge must be sufficient to preclude detonation of adjacent charges.

Operation of the invention as herein disclosed will now be summarized. During the execution of an ASW mission from a patrol aircraft, a number of underwater sound source buoys were dispersed over an ocean area of interest for generating sounds to sonobuoys operating in a listening mode for explosive echo-ranging underwater object detection and localization. Each of the underwater sound source buoys has its L-C circuits tuned for different combinations of two of the seven modulation frequencies of the tone generators 14 in the airborne transmitting station. Assuming that an operator in the patrol aircraft desires to fire the first of the four charges in the underwater sound source buoy tuned for modulation frequencies 5.2 and 7.5 kc., he selects these frequencies on switches 12 and 13. The two frequencies are added in the summing network 11, and the composite signal modulates the R.F. carrier signal 291.4 mc. at the output of the transmitter 10.

The underwater sound source buoy receives the R.F. signal at the receiver 16 passing the combined signal, without the carrier frequency, to the decoder 17. Since the L-C circuits of the decoder 17 are tuned for 5.2 and 7.5 kc., respectively, the AND gate 18 causes the pulse generator 19 to produce a sharp pulse at the solenoid 53 of the switch 50. The armature 52 momentarily connects to the first output of the switch 50 to electrically detonate the lowermost explosive charge 54. The armature 52 returns to a normally open position and remains open until a second pulse appears on the solenoid 53. The timer 9 terminates the transmission of each modulating frequency signal after a predetermined interval. The interval is preferably as short as possible.

Some of the many advantages of the present invention should now be readily apparent. For example, the invention provides selective command control of a large number of buoys from a remote position with a minimum consumption of allocated bandwidths for a given carrier frequency. The concept is particularly suitable for application to underwater sound source buoys wherein a plurality of charges are sequentially fired. It enables considerable extension of the search area by the patrol aircraft with a minimum increase in equipment thereby increasing ASW mission effectiveness. The system is relatively simple and can be constructed of conventional components at relatively low cost.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A radio command buoy system, comprising, in combination:
   - a plurality of tone generator means each producing a tone signal of different frequency;
   - selector switch means connected to said generator means for selection of at least any two of said tone signals;
   - combining means for combining said selected tone signals into one of a possible plurality of different plural-tone signals as determined by said selection;
   - transmitter means for transmitting a carrier frequency signal modulated by said one plural-tone signal; and
   - a plurality of buoys at least one having activating means responsive to said carrier frequency signal as modulated by said one plural-tone signal, the remaining having activating means responsive to said carrier signal as modulated by other of said plural-tone signals.

2. A radio command buoy system as set forth in claim 1 wherein each of said buoy activating means comprises:
   - receiver means for recieving the transmitted signal;
   - decoder means for producing an output signal in response to a respective one of said plural-tone signals;

pulse generating means for producing an output pulse in response to the output signal of said decoder means; and acoustical means connected to and operated by the generating means output for producing an underwater sound.

3. A radio command buoy system as set forth in claim 2 wherein said acoustic means comprises:
   - a sequential switch means having a control input forming the acoustical means input a plurality of outputs each sequentially connected to a D.C. supply for each pulse at the control input; and
   - a plurality of explosive charges respectively connected to the switch means outputs.

References Cited

UNITED STATES PATENTS

| | | | |
|---|---|---|---|
| 2,235,768 | 3/1941 | Luck | 325—37 |
| 2,366,800 | 1/1945 | Nouman | 340—16 |
| 3,086,465 | 4/1963 | Montfort | 102—22 |
| 3,135,943 | 6/1964 | Richard | 340—2X |
| 3,262,388 | 7/1966 | McCarty | 102—18 |

OTHER REFERENCES

Walden et al.: Electronics, vol. 30, No. 6, June 1, 1957, pp. 164–167 relied on.

RICHARD A. FARLEY, Primary Examiner

U.S. Cl. X.R.

340—5; 325—37

UNITED STATES PATENT OFFICE

CERTIFICATE OF CORRECTION

Patent No. 3,564,489 Dated February 16, 1971

Inventor(s) Samuel Pure et al.

It is certified that error appears in the above-identified patent and that said Letters Patent are hereby corrected as shown below:

Column 6, line 9, after "input" insert -- and --.

Signed and sealed this 13th day of July 1971.

(SEAL)
Attest:

EDWARD M.FLETCHER,JR.
Attesting Officer

WILLIAM E. SCHUYLER, JR.
Commissioner of Patents